United States Patent
Bravo Solis et al.

(10) Patent No.: US 9,688,191 B2
(45) Date of Patent: Jun. 27, 2017

(54) FLEXIBLE LIGHT GUIDE FOR VEHICLE DISPLAY APPLICATIONS

(71) Applicant: Continental Automotive Systems, Inc., Auburn Hills, MI (US)

(72) Inventors: Maria Nohemi Bravo Solis, Tlaquepaque (MX); Monica Abigail Aceves Mendoza, Zapopan (MX); Humberto Merchand Alvarado, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 113 days.

(21) Appl. No.: 14/501,210

(22) Filed: Sep. 30, 2014

(65) Prior Publication Data

US 2016/0090030 A1    Mar. 31, 2016

(51) Int. Cl.
*F21V 9/00* (2015.01)
*B60Q 3/04* (2006.01)
*B60Q 3/64* (2017.01)
*B60Q 3/78* (2017.01)
*B60Q 3/10* (2017.01)

(52) U.S. Cl.
CPC .............. *B60Q 3/04* (2013.01); *B60Q 3/10* (2017.02); *B60Q 3/64* (2017.02); *B60Q 3/78* (2017.02)

(58) Field of Classification Search
CPC ........ B60Q 3/002; B60Q 3/004; B60Q 3/005; B60Q 3/04
USPC .......................................... 362/488–492, 511
See application file for complete search history.

(56) References Cited

U.S. PATENT DOCUMENTS

| 4,729,185 A * | 3/1988 | Baba .................... G02B 6/0021 362/615 |
| 7,249,869 B2 * | 7/2007 | Takahashi ............. B60R 13/005 362/300 |

FOREIGN PATENT DOCUMENTS

KR        20140079906 A      6/2014

* cited by examiner

*Primary Examiner* — Jason Moon Han

(57) ABSTRACT

A vehicle display assembly including at least one flexible light guide in a path of illumination to illuminate predetermined different shapes, contours, areas and/or surfaces of the vehicle display assembly. The flexible light guide is silicon or other material suitable to provide flexibility to allow use of the same flexible light guide in different vehicle display assembly shapes and to be a light guide conductor. The flexible light guide is mountable adjacent to at least one light source within the vehicle display assembly to illuminate the predetermined shapes, contours, areas and/or surfaces of the vehicle display assembly visible to vehicle occupants.

19 Claims, 3 Drawing Sheets

FLEXIBLE LIGHT GUIDE FOR VEHICLE DISPLAY APPLICATIONS

FIELD OF THE INVENTION

The present invention relates to vehicle display assemblies having one or more light sources and having a light guide that follows the contours of different features of the assembly and illuminates those features.

BACKGROUND OF THE INVENTION

Vehicle display assemblies typically display information on one or more display surfaces to the occupants of passenger and commercial vehicles. One such vehicle display is an instrument cluster having a speedometer and/or other instrumentation to display important information and values to the vehicle occupants. Conventional instrument cluster assemblies typically include a housing and a display surface. One or more light sources are typically mounted to illuminate the display surface within the housing. Generally, a lens is mounted toward the front of the housing between the vehicle's occupants and the illuminated display surface to protect the display surface and instruments. The one or more light sources illuminate the display surface/instruments making the displayed information more visible to the vehicle occupants.

Other known instrument clusters use light emitting diodes (LEDs) mounted within the housing to illuminate cluster surfaces. Some vehicle display assemblies also have a rigid plastic component mounted in the housing to provide ornamentation. These conventional rigid components are disadvantageously formed of polycarbonate and polymethyl methacrylate. Generally to maximize an aesthetic effect, known rigid components are connected to the housing to allow the display of light transmitted by the LEDs through the rigid component. These components are undesirably rigid and cannot be used with other display geometries due to their rigidity. This undesirably decreases or eliminates the interchangeability of the rigid component for vehicle display assemblies having different geometries since each rigid component must be molded to accommodate a particular device's geometry.

Accordingly, there is a need for a light conductor that is flexible to illuminate different contours, shapes or surfaces and increase the visibility of vehicle display assemblies for providing a more universal light guide for different vehicle display applications.

SUMMARY OF THE INVENTION

The present invention is directed to vehicle display assemblies having at least one light source and at least one flexible light guide in a path of illumination to allow illumination of different predetermined shapes, contours, areas and/or surfaces. The flexibility of the light guide allows the same flexible light guide to be used to illuminate different contours, areas and/or surfaces of a variety of different vehicle display assemblies having equivalent size length or when the illuminated path size is the same. The flexible light guide is operably connected to at least one surface of the vehicle display assembly and operably sized and positioned relative to the at least one light source to illuminate the predetermined shapes, contours, areas and/or surfaces of the vehicle display assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A vehicle display assembly is provided including at least one light source and at least one flexible light guide in a path of illumination to illuminate predetermined different shapes, contours, areas and/or surfaces of the vehicle display assembly. The flexible light guide is silicon or other material suitable to provide flexibility to allow use in different vehicle display assembly shapes and to be a light conductor. The flexible light guide is operably connected to at least one surface of the vehicle display assembly and operably sized and positioned relative to the at least one light source to illuminate the predetermined shapes, contours, areas and/or surfaces of the vehicle display assembly.

Figure 1:
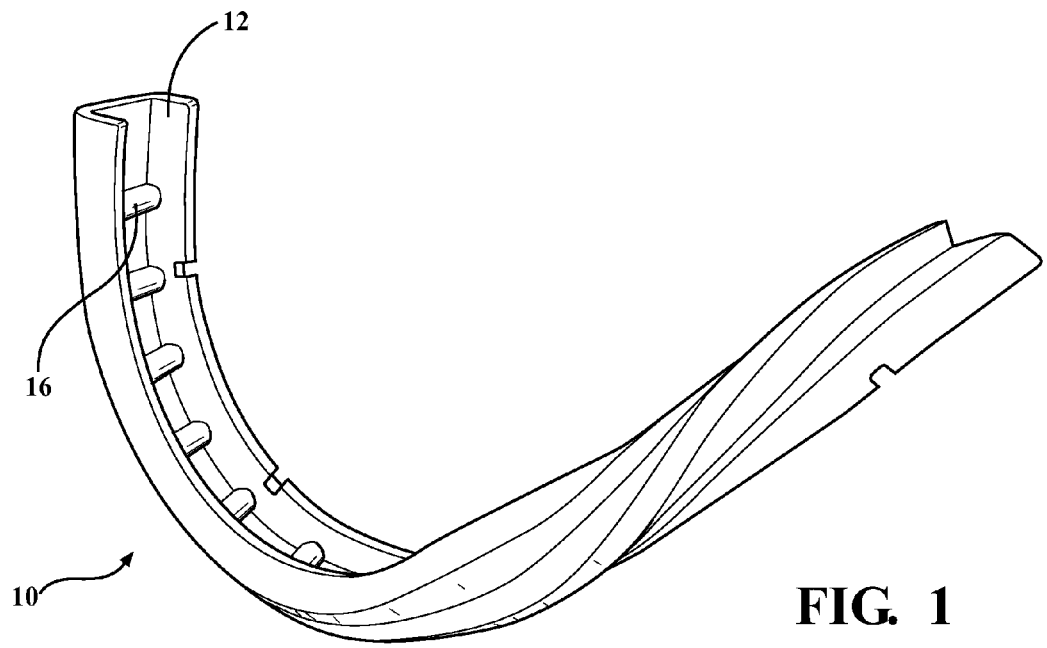
FIG. 1 is a perspective view of an exemplary flexible light guide partially twisted to illustrate flexibility of the flexible light guide, in accordance with the present invention.
Figure 2:
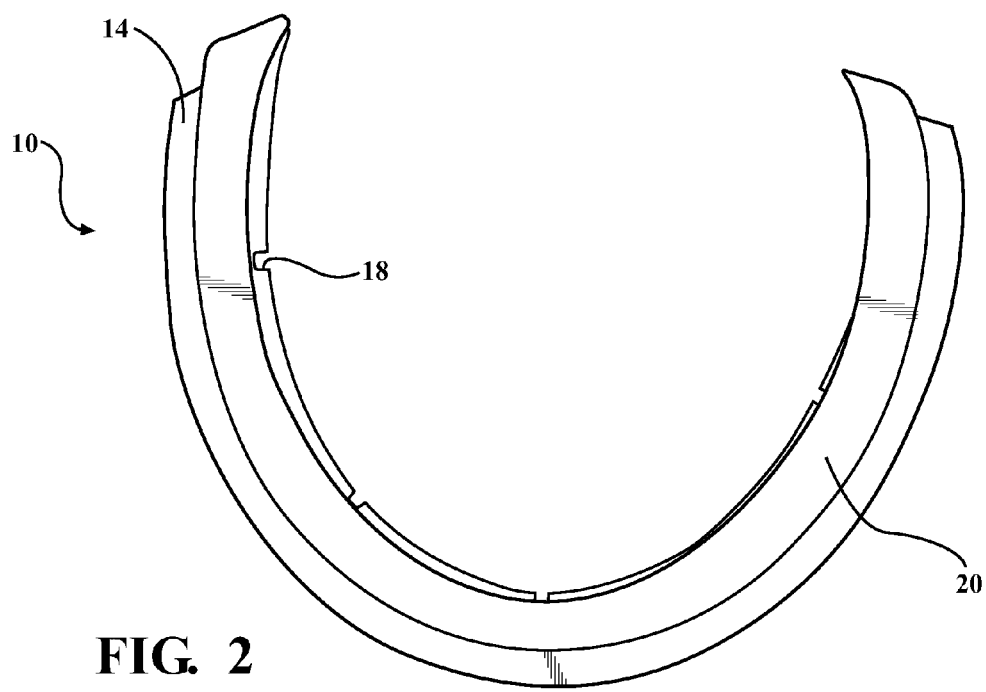
FIG. 2 is a perspective view of the flexible light guide of FIG. 1, in accordance with the present invention.

Referring to FIGS. 1-4 generally, and more particularly to FIGS. 1-2, there is illustrated an exemplary flexible light guide, shown generally at 10, of a vehicle display assembly. The flexible light guide has at least one attachment portion 12 and, optionally, at least one flange portion 14. The attachment portion 12, and, optionally, in combination with the at least one flange portion 14, is suitably shaped for operably connecting to the vehicle display assembly in a pathway of illumination located relative to at least one light source.

By way of non-limiting example, the attachment portion 12 has a U-shaped cross section for attachment to the edge of a component, e.g., housing, of the vehicle display assembly. Optionally, ribs 16 or other suitable protrusion is formed within the attachment portion 12 for gripping to the edge. Optionally, notches 18 or cutouts are spaced along at least one wall of the attachment portion 12 to assist with positioning and connection of the flexible light guide 10 to the vehicle display assembly, e.g., housing.

Other cross-sections of the attachment portion 12 and flange portion 14 are contemplated such that the attachment portion(s) of the flexible light guide are suitable for use in different applications or different geometries. Thus, the flexible light guide described herein is implementable on any other application/dimensions for predetermined vehicle display assemblies that have different shapes, contours, areas and/or surface, but equivalent size length and illumination path size. This is a significant benefit over conventional rigid parts that are not interchangeable parts and cannot be used with other devices.

FIG. 1 further exemplifies the flexibility of the flexible light guide for bending, twisting and otherwise manipulating as needed to operably mount the flexible light guide 10 to a particular component of the vehicle display assembly, e.g., to follow the different shapes or contours. The flexible light guide is a light conductor and the flexibility allows use in different applications. The light illuminates throughout the flexible light guide and is viewable to the vehicle occupants since at least one outer surface 20 is exposed.

Most preferably, the flexible light guide 10 is silicon. The thickness of the flexible light guide 10 is dependent on the light source used. By way of non-limiting example, the thickness is at least 2.0 millimeters (mm), preferably, 2.0 to 10.0 mm, most preferably, 2.0 to 5.0 mm. Most preferably, the thickness is not less than 2.0 mm. The flexible light guide 10 has a predetermined length suitable for respective applications and can be opened (FIG. 1) or closed along its length (FIGS. 3-4).

Figure 3:
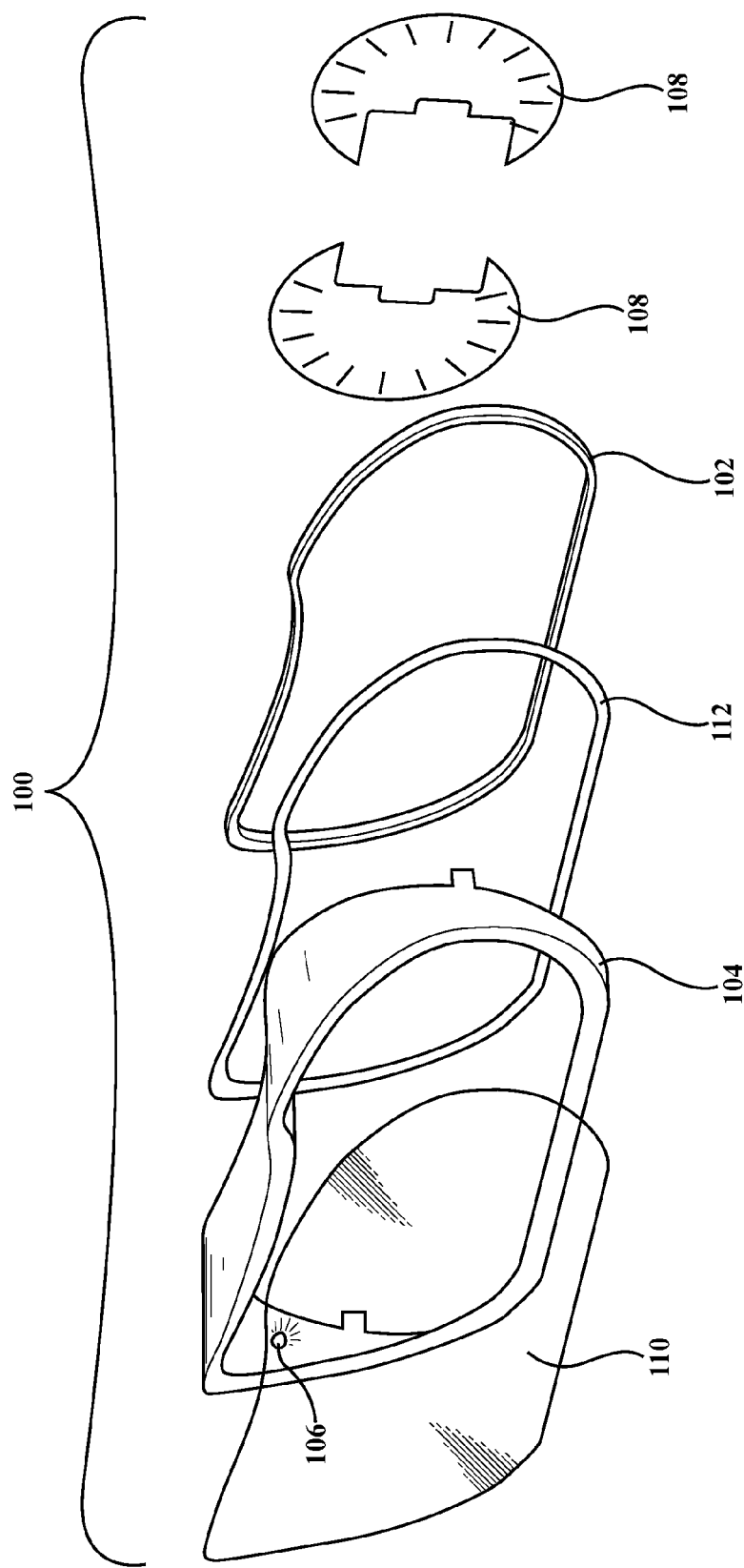
FIG. 3 is an exploded view of an exemplary vehicle display assembly illustrating an environment of use of a flexible light guide in an instrument cluster, in accordance with a second embodiment of the present invention.
Figure 4:
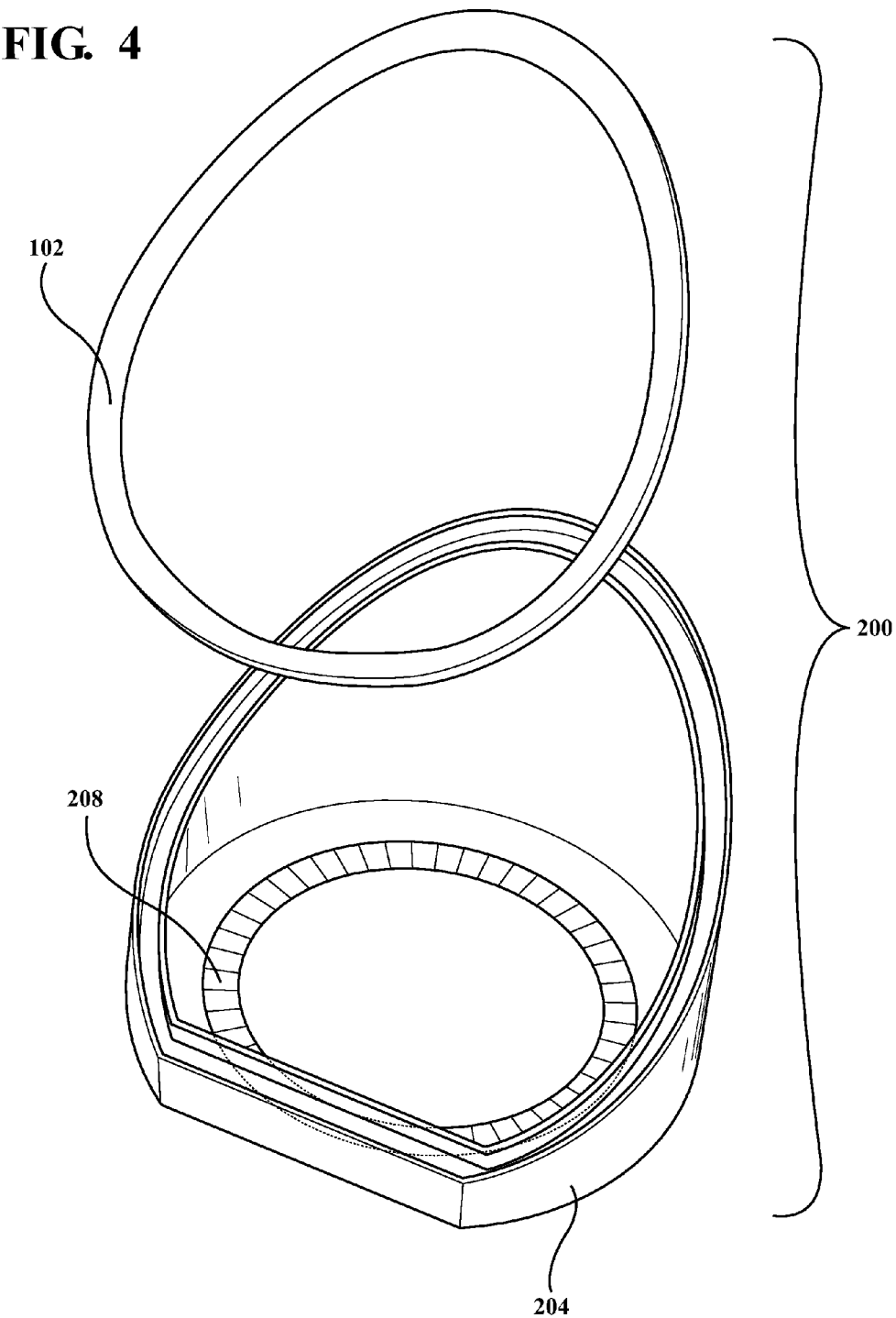
FIG. 4 is an exploded view of another exemplary vehicle display assembly illustrating another environment of use of the flexible light guide of FIG. 3 in another instrument cluster, in accordance with the present invention.

Referring to FIGS. 1-4 generally, and more particularly to FIG. 3, there is illustrated an exploded view of an exemplary vehicle display assembly that is an instrument cluster, generally shown at 100, having at least one flexible light guide 102, in accordance with a second embodiment of the present invention. The vehicle display assembly 100 has a housing 104 to which the flexible light guide 102 is operably coupled.

At least one light source 106, most preferably, at least one LED, is operably connected to at least one side of the interior surface of the housing 106 and the flexible light guide 102 is mounted relative thereto for direct illumination.

A lens 110 is mounted toward the front of the housing 104 between the vehicle's occupants and the illuminated display surface(s) 108 to protect the display surface and instruments. A light diffuser 112 is operably coupled to the housing 102 adjacent the flexible light guide 102, and is formed of a material, e.g., polycarbonate, suitable to diffuse the light.

Referring to FIGS. 1-4 generally, and more particularly to FIG. 4, there is illustrated a partially exploded view of an exemplary vehicle display assembly that is an instrument cluster, generally shown at 200, having the same at least one flexible light guide 102 as FIG. 3, in accordance with the present invention. The vehicle display assembly 200 has similar components as the vehicle display assembly 100, however, the shape is different. The vehicle display assembly 200 includes a housing 204, at least one light source 106, e.g., side mounted LED, and a display surface 208, where the flexible light guide 102 is connected to the front outer edge of the housing 204. The flexible light guide 102 is flexible to be easily manipulated to follow the different shapes having equivalent size/illuminated path size, e.g., of the different shaped housings 104, 204. The same sized flexible light guide 102 conducts light and allows the illumination of different contours, shapes, areas and/or surfaces in lighting applications. This also allows shared components cost reductions which is yet another significant benefit over conventional components.

Referring to FIGS. 1-4 generally, and more particularly to FIGS. 3-4, the at least one light source 106, most preferably, at least one LED, is operably mounted to at least one interior surface of the housing 104, 204, most preferably, on at least one interior side. The flexible light guide 102 is connected a predetermined distance from the light source 106 operably suited to illuminate the predetermined desired shape, contour, area and/or surface of said vehicle display assembly 100, 200. The wall thickness and overall width of the flexible light guide 102 corresponds to the light source 106 used. Preferably, when a side mounted LED is used the flexible light guide 102 is closer to the LED at a predetermined distance from the LED suitable to illuminate the desired features.

Fixation of the flexible light guide 102 depends on the application. In one embodiment the flexible light guide 102 is fixed by pressure to the particular vehicle display assembly such that the flexible light guide 102 is pressed by and held in place between two or more rigid parts, e.g., rigid two-piece housing, of the vehicle display assembly. In the alternative, adhesive is used or in combination with the fixation of rigid parts to press the flexible light guide 102 and hold the guide 102 in place. Alternatively, the flexible light guide includes a U-shaped cross section for attaching to an outer edge of the vehicle display assembly, e.g., to the edge of the housing 104,204.

No attachment fastener, e.g., screws, are used to connect the at least one flexible light guide 102 to the housing 104, 204 that would pierce the flexible light guide 102 because such fasteners would interfere with the behavior of the light inside of the light guide conductor 102.

The flexible light guide 10, 102, 104 is formed of a flexible material, most preferably, silicon, suitable to allow application to different vehicle display assemblies. By way of non-limiting example, the vehicle display assemblies are different shaped instrument clusters, backlights, graphics, radio, multi-media, and communications displays.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle display assembly, comprising:
   a housing for the vehicle display assembly having an outer edge;
   at least one light source; and
   at least one flexible light guide operably coupled to said housing and operably positioned to illuminate contours, areas and/or surfaces of said housing;
   wherein said at least one flexible light guide has a U-shaped cross section defining an attachment portion for attaching to said outer edge of said housing.

2. The vehicle display assembly of claim 1, wherein said at least one flexible light guide is silicon.

3. The vehicle display assembly of claim 1, wherein said at least one flexible light guide is operably flexible to follow different shapes having equivalent size length such that said flexible light guides are operable to provide direct illumination of different contours, areas, and/or surfaces of various vehicle display assemblies configurations or shapes.

4. The vehicle display assembly of claim 1, wherein said at least one light source is operably mounted to at least one side of the interior surface of said housing and said flexible light guide is operably positioned relative to said light source to illuminate the predetermined desired contour, area and/or surface of said vehicle display assembly.

5. The vehicle display assembly of claim 1, wherein each of said at least one light source is a light emitting diode.

6. The vehicle display assembly of claim 5, wherein said vehicle display assembly comprises a plurality of light emitting diodes, wherein the emitted light can be selectively changed between two or more colors illuminating the at least one flexible light guide.

7. The vehicle display assembly of claim 1, wherein said vehicle display assembly comprises a plurality of said light sources.

8. The vehicle display assembly of claim 1, wherein said vehicle display assembly is selected from the group consisting of instrument clusters, backlights, graphics, radio, multi-media, and communications displays, and combinations thereof.

9. The vehicle display assembly of claim 1, wherein said at least one flexible light guide has no rigid portion.

10. The vehicle display assembly of claim 1, wherein said at least one flexible light guide is fixed by pressure to said vehicle display assembly, wherein said at least one flexible light guide is pressed by and held in place between two or more rigid parts of said vehicle display assembly.

11. The vehicle display assembly of claim 1, wherein no attachment fastener is used to connect said at least one flexible light guide to said housing that would pierce said at least one flexible light guide.

12. The vehicle display assembly of claim 1, wherein the predetermined thickness and size of said at least one flexible light guide correlates to the predetermined size of said at least one light source.

13. The vehicle display assembly of claim 1, further comprising a light diffuser operably coupled to said housing relative to said at least one flexible light guide to diffuse the light.

14. The vehicle display assembly of claim 1, wherein said flexible light guide further comprises a plurality of ribs formed on said attachment portion for gripping said outer edge of said housing.

15. The vehicle display assembly of claim 1, wherein said flexible light guide defines a plurality of notches spaced along at least one wall of said attachment portion of said flexible light guide.

16. A vehicle display assembly, comprising:
a housing having an interior surface;
at least one light source mounted to said interior surface of said housing; and
at least one flexible light guide that is silicon, wherein said flexible light guide is operably connected to said vehicle display assembly in a position operable to selectively illuminate contours, areas and/or surfaces of said housing;
wherein said at least one flexible light guide has a U-shaped cross section defining an attachment portion for attaching to an outer edge of said housing.

17. The vehicle display assembly of claim 16, wherein said at least one flexible light guide is operably flexible to follow different shapes having equivalent size length and illumination path size such that said flexible light guides are operable to provide direct illumination of different contours, areas, and/or surfaces of various vehicle display assemblies.

18. The vehicle display assembly of claim 16, wherein said at least one light source is operably mounted to at least one side of the interior surface of said housing and said flexible light guide is operably positioned relative to said light source to illuminate the predetermined desired contour, area and/or surface of said vehicle display assembly.

19. The vehicle display assembly of claim 16, wherein the predetermined thickness and size of said at least one flexible light guide correlates to the predetermined size of said at least one light source.

\* \* \* \* \*